(12) United States Patent
Nielson

(10) Patent No.: US 7,267,374 B2
(45) Date of Patent: Sep. 11, 2007

(54) SWIVEL COUPLING

(75) Inventor: Jeffrey T. Nielson, Piscataway, NJ (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 81 days.

(21) Appl. No.: 11/112,202

(22) Filed: Apr. 22, 2005

(65) Prior Publication Data

US 2006/0237964 A1  Oct. 26, 2006

(51) Int. Cl.
F16L 17/00 (2006.01)
(52) U.S. Cl. .................................. 285/353; 285/364
(58) Field of Classification Search ................ 285/353, 285/384, 246
See application file for complete search history.

(56) References Cited

U.S. PATENT DOCUMENTS

| | | | |
|---|---|---|---|
| 2,980,341 A | 4/1961 | Royer et al. | |
| 3,210,099 A | 10/1965 | Franck | |
| 3,367,681 A * | 2/1968 | Braukman | 285/94 |
| 3,402,253 A | 9/1968 | McCracken | |
| 3,820,825 A | 6/1974 | Morin | |
| 3,900,221 A | 8/1975 | Fouts | |
| 3,921,297 A | 11/1975 | Vit et al. | |
| 3,999,781 A | 12/1976 | Todd | |
| 4,205,886 A | 6/1980 | Teramachi | |
| 4,239,262 A * | 12/1980 | Krupp et al. | 285/61 |
| 4,448,447 A * | 5/1984 | Funk et al. | 285/4 |
| 4,478,435 A | 10/1984 | Cheshier et al. | |
| 4,749,192 A | 6/1988 | Howeth | |
| 4,827,961 A | 5/1989 | Nitzberg et al. | |
| 4,863,202 A * | 9/1989 | Oldford | 285/321 |
| 5,246,143 A | 9/1993 | Cherfane | |
| 5,533,764 A | 7/1996 | Williamson | |
| 6,378,913 B1 | 4/2002 | Wermer et al. | |
| 6,491,325 B1 | 12/2002 | Boche | |
| 6,494,233 B2 * | 12/2002 | Seghi | 138/109 |
| 6,554,320 B2 * | 4/2003 | Cresswell | 285/39 |
| 6,752,433 B2 | 6/2004 | Frost | |
| 2004/0041395 A1 | 3/2004 | Frost | |

FOREIGN PATENT DOCUMENTS

| | | |
|---|---|---|
| DE | 1 057 838 B | 5/1959 |
| GB | 2 274 696 A | 8/1994 |
| WO | WO88/00312 | 1/1988 |
| WO | WO 00/49326 | 8/2000 |

* cited by examiner

*Primary Examiner*—David Bochna
(74) *Attorney, Agent, or Firm*—Larson Newman Abel Polansky & White LLP; Chi Suk Kim

(57) ABSTRACT

A coupling includes a main body, a rotatable member, and a seal member. The main body has an internal passageway for fluid flow therethrough, and includes a first portion defining a first end of the coupling and includes a second portion defining a second end of the coupling and forming an abutment structure. The rotatable member encircles the main body along the second portion, and includes an engagement structure for engaging a complementary structure. The rotatable member has first and second opposite axial ends, and the seal member is disposed between at least one of the first and second opposite axial ends of the rotatable member and the main body.

26 Claims, 3 Drawing Sheets

SWIVEL COUPLING

FIELD OF THE DISCLOSURE

This disclosure, in general, relates to swivel couplings.

BACKGROUND

When coupling hoses, pipes, nozzles, and other fluid conduits, it is often desirable to allow for rotational freedom between the fluid conduits. For example, market demand has been particularly notable for couplings that provide rotational freedom when attaching hoses and pipes to other fluid flow structures, such as nozzles. In one example, a swivel coupling joining a hose and, for example, a nozzle, allows a user to control the direction of fluid flow. In another example, handheld nozzles may be attached to hoses using a swivel coupling. In such an example, swivel couplings allow the user to hold the handheld nozzle while permitting the hose to freely rotate, preventing entanglement and crimping of the hose.

Traditional swivel couplings include a main body and a rotatable component. Typically, the main body and rotatable components are formed of different materials, such as steel and brass. In these traditional swivel couplings, the rotatable component is typically secured in place using a snap ring or by flaring an end of the main body and often has a degree of axial freedom of movement with respect to the main body.

However, such typical couplings tend to catastrophically fail or form leaks, resulting in a short useful lifespan. Snap rings and flares wear over time, leading to release of the rotatable member and jettisoning, for example, an attached nozzle. These typical couplings have also been shown to form leaks, leading to premature replacement expenses. In addition, materials used in a typical rotatable member are often unsuitable for harsh environments, such as corrosive chemical environments. As such, an improved coupling system would be desirable.

SUMMARY

In a particular embodiment, the disclosure is directed to a coupling including a main body, a rotatable member, and a seal member. The main body has an internal passageway for fluid flow therethrough. The main body includes a first portion defining a first end of the coupling and includes a second portion defining a second end of the coupling and forming an abutment structure. The rotatable member encircles the main body along the second portion, and includes an engagement structure for engaging a complementary structure. The rotatable member has first and second opposite axial ends and the seal member is disposed between at least one of the first and second opposite axial ends of the rotatable member and the main body.

In another exemplary embodiment, the disclosure is directed to a coupling including an insert, a crimp ring, and a rotatable member. The insert has an internal passageway for fluid flow therethrough. The insert includes a first portion defining a first end of the coupling and includes a second portion defining a second end of the coupling. The crimp ring is coupled to the second portion, and the rotatable member encircles the insert along the second portion axially opposite the second end with respect to the crimp ring. The rotatable member includes an engagement structure for engaging a complementary structure.

In a further exemplary embodiment, the disclosure is directed to a coupling including a main body, a rotatable member, and a spring. The main body has an internal passageway for fluid flow therethrough and includes a first portion defining a first end of the coupling. The main body includes a second portion defining a second end of the coupling and forming an abutment structure. The rotatable member encircles the main body along the second portion and includes an engagement structure for engaging a complementary structure, and has first and second opposite axial ends. The spring axially biases the rotating member against the main body.

In an additional exemplary embodiment, the disclosure is directed to a coupling including an insert, a crimp ring, a rotatable member, a seal member, and a spring. The insert has an internal passageway for fluid flow therethrough, and includes a first portion defining the first end of the coupling and includes a second portion defining a second end of the coupling. The crimp ring is coupled to the second portion. The rotatable member encircles the insert along the second portion axially opposite the second end with respect to the crimp ring and includes an engagement structure for engaging a complementary structure. The rotatable member has first and second opposite axial ends, and the seal member is disposed between at least one of the first and second opposite axial ends of the rotatable member and at least one of the insert and the crimp ring. The spring axially biases the rotatable member against at least one of the insert and the crimp ring.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWING(S)

In a particular embodiment, the disclosure is directed to a swivel coupling including a main body and a rotatable member. The main body includes a first portion defining a first end and defining a first engagement structure. For example, the first engagement structure may be a barbed hose insert, a clamp fitting or a threaded fitting. The main body also includes a second portion defining a second end and forming an abutment structure. In one exemplary embodiment, the main body includes an insert and a crimp ring, the crimp ring forming the abutment structure and being crimped around a portion of the insert.

The rotatable member is disposed along the second portion of the main body. In one embodiment, a seal member, such as an O-ring, is disposed between an axial end of the rotatable member and the main body. For example, the seal member may be disposed between an axial end of the rotatable member and the crimp ring. In another example, the seal member may be disposed between an axial end of the rotatable member and an intermediate structure of the main body.

In addition, the coupling may include a spring, such as a wave spring washer, that axially biases the rotatable member and, optionally, the sealing member against the main body, such against as the abutment structure or against the intermediate structure. In a particular embodiment, the rotatable member and the main body are formed of the same material, such as stainless steel.

In an additional embodiment, the disclosure is directed to a method of forming a swivel coupling. The method includes placing the spring, the seal member, and the rotatable member, over the second portion of the main body. The method further includes compressing the spring, sealing member, and rotatable member axially while crimping a crimp ring around the second portion to secure the rotatable member along the second portion such that the spring biases the rotatable member against the crimp ring. In one example, the method further includes lubricating o-rings and contact surfaces with lubricant.

Figure 1:
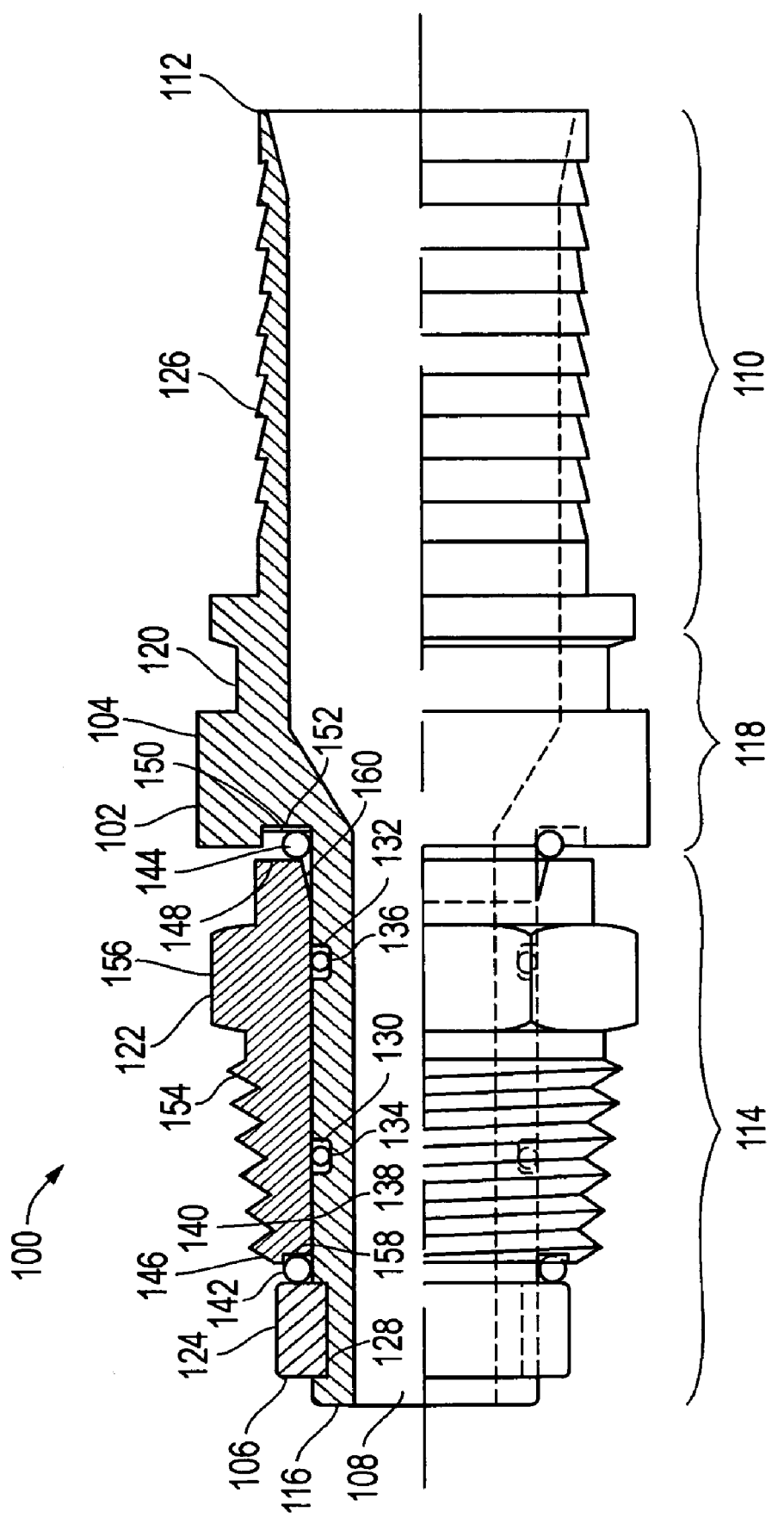
FIG. 1 is an illustration of an exemplary embodiment of a swivel coupling.

FIG. 1 includes an illustration of an exemplary embodiment of a swivel coupling 100. The swivel coupling 100 includes a main body 102 and a rotatable member 122. In general, the rotatable member 122 is secured to the main body 102 by an abutment structure 106. In the illustrated embodiment, the rotatable member 122 is located along the second portion 114 opposite the second end 116 with respect to the abutment structure 106. Typically, the rotatable member 122 is attached to permit free rotation about the main body 102.

The main body forms a fluid passageway 108. In addition, the main body 102 includes a first portion 110 that defines a first end 112 of the coupling 100 and includes a second portion 114 that defines a second end 116 of the coupling 100. The first portion 110 defines an engagement structure 126. In exemplary embodiments such as the illustrated embodiment, the engagement structure 126 is configured to attach to fluid conduits such as hoses, pipes and other complementary couplings. For example, the engagement structure 126 may form a barbed hose coupling as illustrated. In alternative examples, the engagement structure 126 includes pipe threads or clamp type engagement structures. The second portion 114 of the main body 102 is configured to receive the rotatable member 122 and secure the rotatable member 122 to the main body 102 with an abutment structure 106. In one particular embodiment, the main body 102 is formed of an insert 104 and the abutment structure 106, the abutment structure being in the form of a crimp ring 124 secured to the second portion 114 of the insert 104. In particular, the crimp ring 124 is formed of a continuous annular structure that is secured to the insert 104 through compression in a radial direction.

The main body 102 may also include an intermediate portion 118. The intermediate portion 118 may include a securing structure 120 for securing the main body when coupling the engagement structure 126 to a fluid conduit or a complementary coupling. In the illustrated embodiment, the intermediate portion 118 has a larger diameter than the second portion 114.

Figure 2:
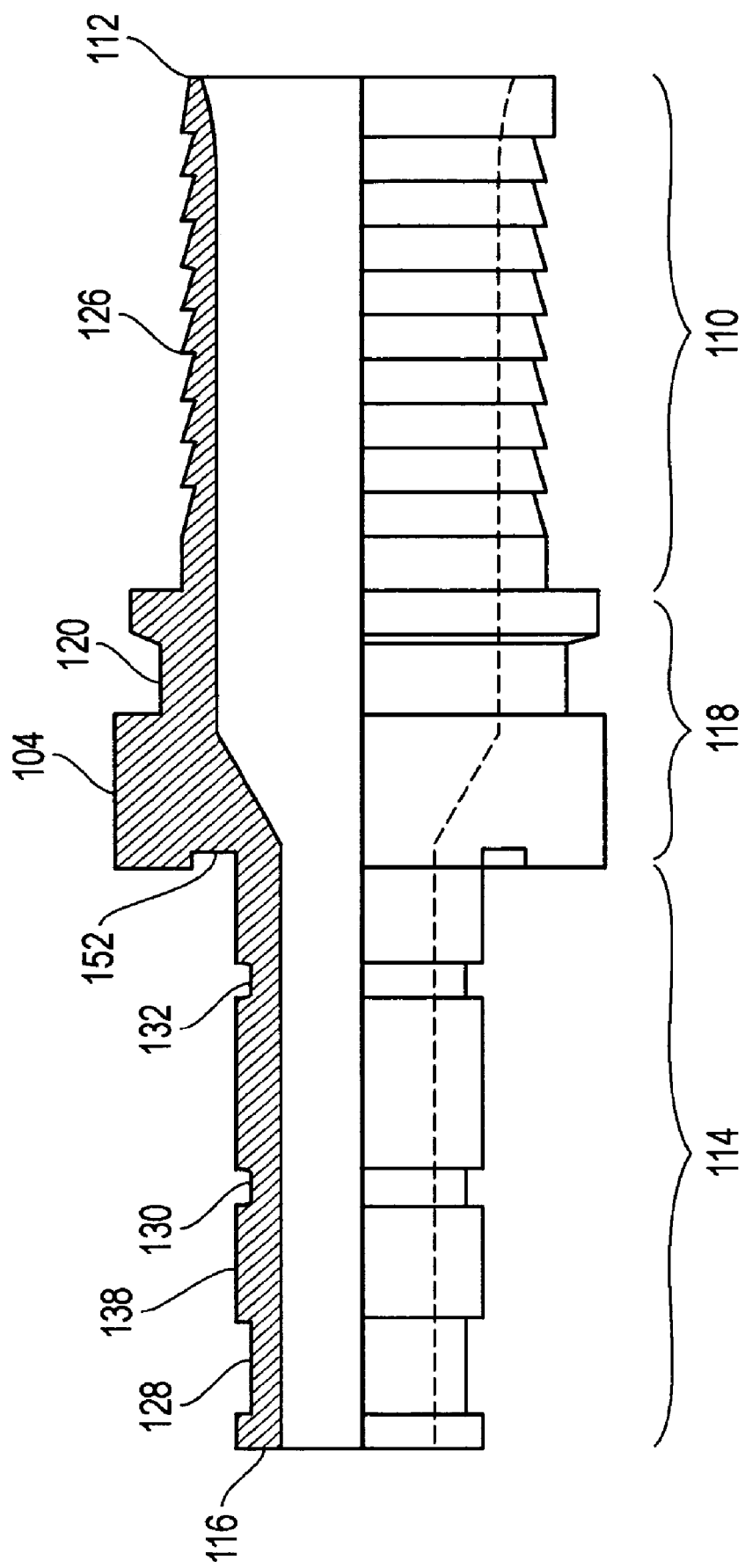
FIG. 2 includes an exemplary illustration of an insert forming a part of a swivel coupling, such as the exemplary swivel coupling of FIG. 1.

FIG. 2 illustrates an exemplary insert 104. The insert 104 includes the first portion 110 that defines the first end 112 and the engagement structure 126. The insert 104 further includes the intermediate portion 118 and the second portion 114. In the illustrated embodiment, the second portion 114 includes a recess 128 for receiving the abutment structure 106, such as the crimp ring 124. The insert 104 may further include additional recesses, such as recesses 130 and 132 for receiving seal components (e.g., components 134 and 136), as illustrated in FIG. 1.

Returning to FIG. 1, the seal components 134 and 136 may be located in the recesses 130 and 132 along an outer surface 138 of the second portion 114 of the main body 102. Generally, the seal components 134 and 136 are radial seal components disposed between the outer surface 138 and an inner surface 140 of the rotatable member 122 (i.e., the radial seal components are disposed radially interior to the inner surface 140 of the rotatable member 122). In one particular embodiment, the seal components 134 and 136 are formed of O-rings, such as rubber or elastomeric O-rings. Particular examples of seal component O-rings include Viton® O-rings, elastomeric fluoropolymer O-rings, and elastomeric silicone O-rings. Alternatively, the seal components 134 and 136 may be annular structures having surfaces that conform to the inner surface 140 of the rotatable member 122. Typically, the seal components 134 and 136 and the surfaces 138 and 140 are lubricated.

The swivel coupling may also include one or more seal members, such as seal members 142 and 144. Each of the seal members 142 and 144 is an axial seal member disposed between at least one of the first and second opposite axial ends (146 and 148, respectively) of the rotatable member 122 and the main body 102. For example, the seal member 142 may be located between a first axial end 146 of the rotatable member 122 and the abutment structure 106. In particular, the seal member 142 may directly contact and abut the abutment structure 106 and the first axial end 146 of the rotatable member 122. In another example, the seal member 144 may be located between a second axial end 148 of the rotatable member 122 and the intermediate portion 118 of the main body 102. For example, the seal member 144 may directly contact and abut the second axial end 148 and the intermediate portion 118. The seal members 142 and 144 may also act as bearing surfaces or thrust surfaces. In particular examples, the seal members 142 and 144 may be formed of an annular component, such as an O-ring, including Teflon® O-rings.

In addition, a spring 150 may be configured to axially bias the rotatable member 122 and, optionally, the seal members 142 and 144 (if present) against the main body 102, such as against the abutment structure 106 or against the intermediate portion 118. As used herein, the term "against" is used to denote a direction of a biasing force and does not preclude the existence of intermediate structures. In one embodiment, the spring 150 is formed of a wave spring washer. In addition, the spring 150 may be disposed within a recess 152 of the insert 104.

Figure 3:
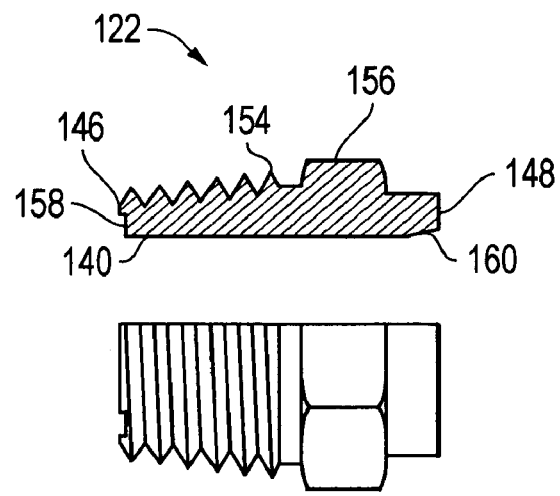
FIG. 3 includes an illustration of an exemplary rotatable member of a swivel coupling, such as the swivel coupling of FIG. 1.

As illustrated in FIG. 3, the rotatable member 122 includes an engagement structure 154 configured to couple with complementary engagement structures. The engagement structure 154 may be a threaded structure, a clamp-type structure, or a barbed structure. In particular embodiments, the rotatable member 122 is configured to engage couplings, nozzles, or other fluid conduits that have structures complementary to the engagement structure 154. In one embodiment, the rotatable member 122 also includes a securing structure 156 for rotationally securing the rotatable member 122. For example, the securing structure 156 may include structures permitting transfer of rotational force to the rotatable member 122. Exemplary structures include wings and structures including at least two parallel and radially opposite surfaces or flats, such as a hex nut structure. The rotatable member 122 may include a recess 158 at the first axial end 146. For example, the recess 158 is configured to receive a portion of the seal member 142. On the opposite axial end 148, the rotational member 122 may include an internal bevel 160.

Portions of the main body 102, such as the insert 104 and the abutment structure 106, may be formed of the same material as the rotatable member 122. Exemplary materials include brass or steel. In one particular embodiment, the rotatable member and the insert are formed of stainless steel.

In one exemplary embodiment, the swivel coupling 100 is formed by placing the spring 150, the seal members (142 and 144), and the rotatable member 122 over the second portion 114 of the insert 104. The spring 150, the seal members (142 and 144), and the rotatable member 122 are compressed while crimping a crimp ring 124 around the second portion 114. As such, the rotatable member 122 is secured along the second portion 114 such that the spring 150 biases the rotatable member 122 and the seal members (142 and 144) against the crimp ring 124 while permitting the rotatable member 122 to rotate. In one example, the method further includes lubricating o-rings, such as the seal members (142 and 144) and the seal members (134 and 136), and the contact surfaces (138 and 140) with lubricant.

Figure 4:
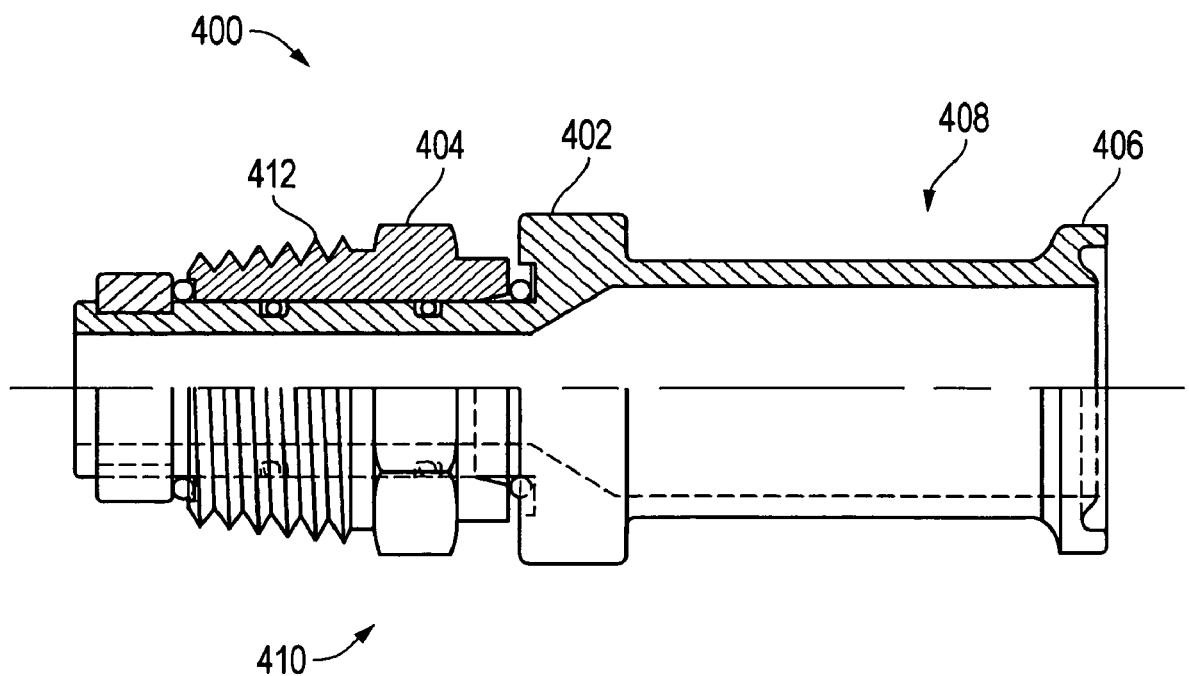
FIG. 4 includes an illustration of an exemplary swivel coupling.

FIG. 4 includes an exemplary embodiment of a swivel coupling 400. The swivel coupling 400 includes a main body 402 and a rotatable member 404. A first portion 408 of the main body 402 includes an engagement structure 406, such as a mini-clamp type fitting. The rotatable member 404 is rotatably secured to the second portion 410 of the main body 402 and defines a threaded engagement structure 412.

Particular embodiments of the above-disclosed swivel couplings advantageously exhibit improved operation when compared with other traditional swivel couplings. For example, embodiments permit use of the same metallic material in the rotatable member and the insert. As such, durable metals adapted for use in harsh environments, such as corrosive and chemically demanding environments, may be used for each of the metallic components of the swivel coupling, including the insert, the rotatable member and, optionally, the crimp ring. In contrast, traditional couplings use different materials for the rotatable member and main body to prevent galling. Often, in a traditional coupling, the rotatable member is formed of lubricious material to prevent galling, but such materials (e.g., brass0 are softer and less chemically resistant materials than the main body, making traditional swivel couplings unsuitable for use in harsh environments.

In other exemplary embodiments, the arrangement of a spring providing axial biasing to the rotatable member and seal members against the main body provides an improved and durable seal. In a further exemplary embodiment, the configuration shows improved durability when compared with traditional couplings having spring rings or insert flares. Particular embodiments of the above-disclosed swivel couplings are well suited for applications having pressures of at least about 100 psi, such as at least about 150 psi or at least about 400 psi.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A coupling comprising:
a main body having an internal passageway for fluid flow therethrough, the main body including a first portion defining a first end of the coupling, the main body including a second portion defining a second end of the coupling and forming an abutment structure;
a rotatable member encircling the main body along the second portion, the rotatable member comprising an engagement structure for engaging a complementary structure, the rotatable member having first and second opposite axial ends;
a seal member disposed between at least one of the first and second opposite axial ends of the rotatable member and the main body; and
a spring biasing the rotatable member and seal member against the main body, wherein the spring is disposed in a recess in the main body.

2. The coupling of claim 1, wherein the main body and the rotatable member comprise the same material.

3. The coupling of claim 2, wherein the material is stainless steel.

4. The coupling of claim 1, wherein the main body comprises an insert and a crimp ring, the crimp ring forming the abutment structure.

5. The coupling of claim 4, wherein the crimp ring is disposed in a recess in the second portion.

6. The coupling of claim 1, wherein the seal member directly contacts and abuts the first opposite axial end of the rotatable member.

7. The coupling of claim 1, further comprising a second seal member disposed between the other of the first and second opposite axial ends of the rotatable member and the main body.

8. The coupling of claim 7, wherein the second seal member directly contacts and abuts the second opposite axial end of the rotatable member.

9. The coupling of claim 1, wherein the spring is a wave spring washer.

10. The coupling of claim 1, further comprising a second seal member disposed between an inside surface of the rotatable member and an outside surface of the second portion of the main body.

11. The coupling of claim 1, wherein the engagement structure comprises threads.

12. The coupling of claim 1, wherein the first portion defines a second engagement structure.

13. The coupling of claim 12, wherein the second engagement structure comprises a barbed hose insert.

14. The coupling of claim 12, wherein the second engagement structure comprises a clamp structure.

15. The coupling of claim 1, wherein the rotatable member comprises a structure for rotationally securing the rotatable member.

16. The coupling of claim 15, wherein the structure comprises at least two opposing flats for fitting a wrench.

17. The coupling of claim 1, wherein the main body comprises an intermediate portion comprising a structure for securing the main body.

18. A coupling comprising:
an insert having an internal passageway for fluid flow therethrough, the insert including a first portion defining a first end of the coupling, the insert including a second portion defining a second end of the coupling;
a crimp ring coupled to the second portion;
a rotatable member encircling the insert along the second portion axially opposite the second end with respect to the crimp ring, the rotatable member comprising an engagement structure for engaging a complementary structure; and a spring axially biasing the rotatable member against the crimp ring, the spring disposed in a recess of the insert.

19. The coupling of claim 18, wherein the insert and the rotatable member comprise the same material.

20. The coupling of claim 19, wherein the material is stainless steel.

21. The coupling of claim 18, further comprising a seal member disposed between an inside surface of the rotatable member and an outside surface of the second portion of the insert.

22. A coupling comprising:
a main body having an internal passageway for fluid flow therethrough, the main body including a first portion defining a first end of the coupling, the main body including a second portion defining a second end of the coupling and forming an abutment structure;
a rotatable member encircling the main body along the second portion, the rotatable member comprising an engagement structure for engaging a complementary structure; and
a spring axially biasing the rotatable member against the main body, wherein the spring includes a wave spring washer, wherein the spring is disposed in a recess in the main body.

23. The coupling of claim 22, wherein the main body and the rotatable member comprise the same material.

24. The coupling of claim 23, wherein the material is stainless steel.

25. The coupling of claim 22, further comprising a seal member disposed between an inside surface of the rotatable member and an outside surface of the second portion of the main body.

26. A coupling comprising
an insert having an internal passageway for fluid flow therethrough, the insert including a first portion defining a first end of the coupling, the insert including a second portion defining a second end of the coupling;
a crimp ring coupled to the second portion;
a rotatable member encircling the insert along the second portion axially opposite the second end with respect to the crimp ring, the rotatable member comprising an engagement structure for engaging a complementary structure, the rotatable member having first and second opposite axial ends;
a seal member disposed between at least one of the first and second opposite axial ends of the rotatable member and at least one of the insert and the crimp ring; and
a spring axially biasing the rotatable member against at least one of the insert and crimp ring, the spring disposed in a recess in the insert.

* * * * *